R. H. SCHLEICHER.
FRICTION CLUTCH.
APPLICATION FILED MAY 17, 1917.

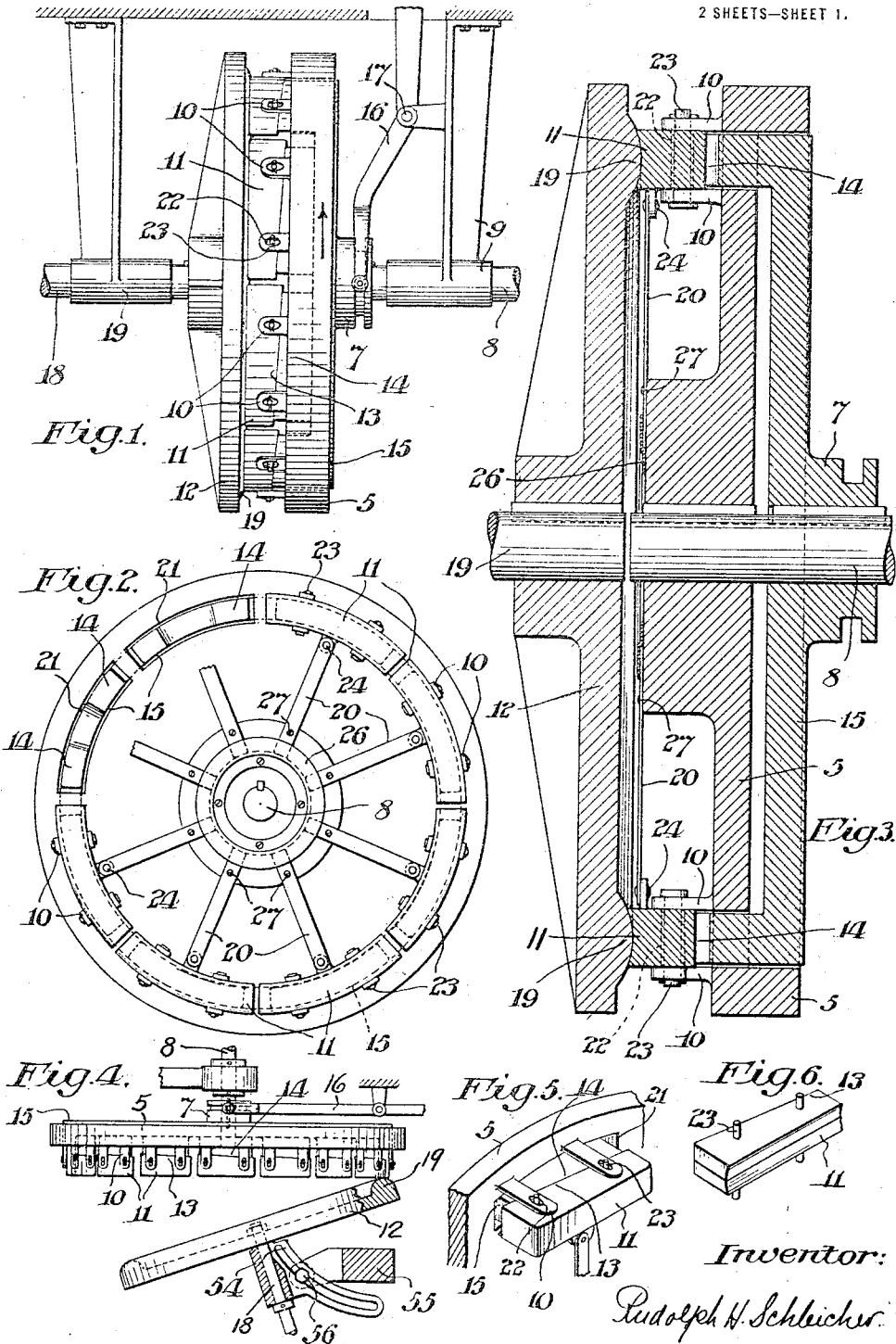

1,288,220.

Patented Dec. 17, 1918.
2 SHEETS—SHEET 2.

Inventor:
Rudolph H. Schleicher

UNITED STATES PATENT OFFICE.

RUDOLPH H. SCHLEICHER, OF PHILADELPHIA, PENNSYLVANIA.

FRICTION-CLUTCH.

1,288,220.     Specification of Letters Patent.     Patented Dec. 17, 1918.

Application filed May 17, 1917. Serial No. 169,314.

*To all whom it may concern:*

Be it known that I, RUDOLPH H. SCHLEICHER, a citizen of the United States, and a resident of Philadelphia, Philadelphia county, State of Pennsylvania, have invented certain new and useful Improvements in Friction-Clutches, of which the following is a specification.

This invention relates to friction clutches for the driving and driven elements of power transmission mechanism.

The primary object of my invention is to provide a friction clutch which is operable with facility to effect a variable though constantly-acting clamping connection between driving and driven machine elements, at the will of the operator, and thus attain a predetermined intermittent or differential speed between the said elements, as, for example, for the purpose of starting at a relatively slow speed certain machines having complementary gears which are adapted to be initially shifted into intermeshing relation.

A further object of my invention is to provide a friction clutch which is effective in connection not only with driving and driven elements in axial alinement with each other but with such elements having their respective axes of rotation in angular relation to each other.

With these and other objects in view my invention, generally stated, comprehends a friction clutch whereof the driving element includes a series of annularly disposed friction members supported independently of but movable into and from operative relation to the driven element of the clutch, and also a complementary cam member for actuating said friction members, and means for effecting a relative shifting of the cam member and the driven element toward or from each other, whereby a variable pressure can be applied at the will of the operator to the series of friction members in order to effect a corresponding clamping connection thereby between the driving and driven elements.

The invention also comprises various novel features of construction and combinations of parts which will be hereinafter described and claimed.

In the drawings—

Figure 1 is an elevation of a face clutch embodying my invention.

Fig. 2 is a face view of the driving element, showing the annular arrangement of the friction members and their adjuncts partly broken.

Fig. 3 is an enlarged section through the clutch mechanism.

Fig. 4 is a view, partly in section, showing the shafts or axes of the two elements in angular relation to each other.

Fig. 5 is a perspective view of one of the friction members and adjacent parts.

Fig. 6 is a similar view of a slightly modified form of friction member detached.

Figure 7:
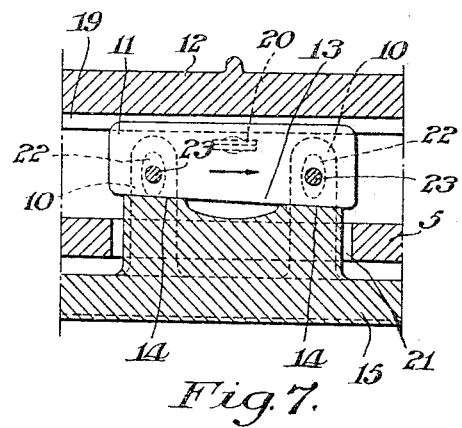
Fig. 7 is a section enlarged through adjacent portions of the driving and driven elements, showing one of the friction shoes and its complementary cam member.

Referring to Fig. 1 of the drawings, 8 designates a drive shaft, and 18 a shaft arranged in axial alinement therewith adapted to be driven therefrom, said shafts having their bearings in suitably-disposed brackets, 9, 19' respectively. On the shafts 8 and 18 are mounted the driving and driven elements respectively.

In the present instance the driven element comprises a disk 12 which is keyed or otherwise affixed to the shaft 18, the inner face of said disk being preferably provided adjacent its periphery with an annular enlargement 19 which constitutes a frictional bearing surface. The driving element comprises a disk 5 which is keyed or otherwise affixed to the shaft 8, which disk is provided adjacent its periphery with a concentric series of openings 21, through which extend a corresponding series of projections on the inner side of a cam member 15, the faces of said projections being inclined similarly to each other in order to constitute a succession of counterpart cam surfaces 14.

In the present instance the cam member comprises a disk provided with a circumferentially grooved hub 7 which is splined on the shaft 8 so as to be longitudinally movable on but rotatable with the same. To the grooved hub 7 is connected the forked arm of a hand lever 16 which is pivoted, as at 17, to a lug on the bearing bracket 9. Thus by properly manipulating the lever the cam member can be bodily moved longitudinally of the shaft 8.

The disk 5 is provided on its inner side, adjacent the openings 21, with spaced lugs 10 which afford bearings for independently movable friction members, comprising segmental shoes 11 which correspond in number and annular relation with the cam projections. These shoes are formed with inclined cam surfaces 13 which are maintained in sliding contact with the cam surfaces 14 of the projections by means of radially disposed spring strips 20, the outer ends of which are fastened to lugs on the shoes by means of pins 24, and the inner ends of which strips are loosely held on the disk 5 by a binding ring 26 and suitably-disposed screws 27.

The friction members are supported in their bearings by means of cross pins 23 which, extending through enlarged slots 22 in the lugs 10, permit of limited independent movement of said members toward and from the disk 5, as will presently appear. (See Fig. 7.)

When the hand lever 16 is actuated with a predetermined force to move the cam member 15 inward the cam projections of the latter advance the series of friction members simultaneously into frictional contact with the bearing ring 19 of the driven disk 12, thus effecting a clamping of such members between the cam member and the driven disk; and as the driving disk and its associated cam member rotate concurrently in the direction indicated by the arrow, (while the lever is being manually operated) the clamping force of the friction members is increased by the co-action of the cam surfaces of said members and the cam projections, respectively, in opposition to the stress of the springs 20. When the hand lever is shifted to withdraw the cam member from its clamping position, these springs automatically retract the friction members in a rearward direction.

Since the cam member and the several friction members 11 when held against the opposing disk are positive in their action, and since the friction is effected by separate units acting freely and independently of each other on the opposing disk, it will be seen that by my invention a clutching action of great power is attained, and this irrespective of any unevenness of the surface of the disk.

In Fig. 4 my invention is illustrated as adapted to use with clutch elements having their axes of rotation in angular relation to each other. In this arrangement the shaft 18 of the driven element is disposed at an angle to the shaft of the driving element, said driven element being provided with a circumferential ring 19 with which the annular series of friction members 11 progressively engage, and thus impart a continuous succession of rotary impulses to the driven member. The bearing for the shaft 18 is preferably adjustably secured to a supporting bracket 55, by means, for example, of a slotted bearing extension 54 and a clamp bolt 56 extending through the extension and the bracket.

In Fig. 6 is shown a modified form of friction member 11 comprising two or more laminated parts of leather, fiber or other suitable material.

It is to be understood that I do not limit myself to the details of construction herein disclosed as the same may be modified within the principle of my invention and the scope of the appended claims.

I claim—

1. In a friction clutch, the combination with a driven element, of a driving element therefor comprising a rotatable member, a cam member co-axial therewith having an annular series of cam surfaces, a corresponding annular series of friction members loosely supported on said rotatable member and carried thereby separately and independently of the driven element, said friction members having cam surfaces complemental to and in limited sliding contact with the cam surfaces of the cam member, and means for effecting a relative shifting of the said cam member and the driven element toward or from each other as desired.

2. In a friction clutch, the combination with a driven element, of a driving element therefor comprising a rotatable member, a cam member co-axial therewith having an annular series of cam surfaces, a corresponding annular series of friction members loosely supported on said rotatable member and carried thereby separately and independently of the driven element, said friction members having cam surfaces complemental to and in limited sliding contact with the cam surfaces of the cam member, and springs acting upon said friction members to retract them normally rearward, and means for effecting a relative shifting of the said cam member and the driven element toward or from each other as desired.

3. In a friction clutch, the combination with a driven element, of a driving element therefor comprising a rotatable element, a cam member co-axial therewith having an annular series of cam surfaces, a corresponding annular series of friction members having inclined cam surfaces complemental to and in limited sliding contact with the cam surfaces of the cam element, and means comprising pin-and-slot connections between the driving element and the friction members whereby the latter are loosely supported on the driving element and carried thereby separately and independently of the driven element, and means for effecting a relative shifting of the said cam member and the driven element toward or from each other.

4. In a friction clutch having opposing driving and driven disks, a series of annularly arranged friction members on the driving disk, loosely fitting pin-and-slot connections between said members and the driving disk, springs tending normally to retract said members, a cam member co-axial with said driving disk and movable relatively thereto, said cam member having cam surfaces corresponding in number and relation with said friction members, and means for moving said cam member toward the driven disk.

5. In a friction clutch having opposing driving and driven disks, a series of annularly arranged similarly constructed friction members on the driving disk, loosely fitting pin-and-slot connections between said members and driving disk, springs tending normally to retract said members, a cam member co-axial with said driving disk and movable relatively thereto, said cam member having cam surfaces corresponding in number and relation with said friction members, means for moving said cam member toward the driven disk, and means whereby the axis of rotation of the driven disk may be angularly adjusted in relation to that of the driving disk.

6. In a friction clutch, the combination with a driven element, of a driving element therefor comprising a disk having transverse openings adjacent its periphery, a shaft to which said disk is affixed, a cam member slidingly mounted on said shaft adjacent said disk and having a series of projections slidingly fitted to said openings, said projections having cam surfaces, segmental friction shoes loosely mounted on said disk adjacent the openings of the latter, said shoes having cam surfaces complemental to those of the projections, retracting springs for said shoes, and means for bodily shifting said cam member toward or from the driven element.

In witness whereof, I have hereunto set my hand, this 16th day of May, 1917.

RUDOLPH H. SCHLEICHER.

In the presence of—
LE ROY SCHOCH,
JAS. G. FRANCES.

Copies of this patent may be obtained for five cents each, by addressing the "Commissioner of Patents, Washington, D. C."